(12) United States Patent (10) Patent No.: US 9,378,170 B1
Wu (45) Date of Patent: Jun. 28, 2016

(54) CODING USING A COMBINATORIAL NUMBER SYSTEM

(71) Applicant: Xilinx, Inc., San Jose, CA (US)

(72) Inventor: Ephrem C. Wu, San Mateo, CA (US)

(73) Assignee: XILINX, INC., San Jose, CA (US)

(*) Notice: Subject to any disclaimer, the term of this patent is extended or adjusted under 35 U.S.C. 154(b) by 617 days.

(21) Appl. No.: 13/829,871

(22) Filed: Mar. 14, 2013

(51) Int. Cl.
*G06F 13/42* (2006.01)
*G06F 13/40* (2006.01)

(52) U.S. Cl.
CPC ............ *G06F 13/4022* (2013.01); *G06F 13/42* (2013.01)

(58) Field of Classification Search
CPC .............................. G06F 13/42; G06F 13/4022
See application file for complete search history.

(56) References Cited

U.S. PATENT DOCUMENTS

| | | | | |
|---|---|---|---|---|
| 5,525,983 A * | 6/1996 | Patel | ................... | H04L 25/4925 341/57 |
| 6,304,196 B1 * | 10/2001 | Copeland | ............... | H04N 19/60 341/50 |
| 6,430,230 B1 * | 8/2002 | Cunningham | ...... | H04L 25/4908 375/292 |
| 2011/0025533 A1 * | 2/2011 | Abbasfar | ............... | H03M 5/145 341/63 |
| 2014/0208181 A1 * | 7/2014 | Daniel | ................... | H03M 13/51 714/752 |
| 2014/0226734 A1 * | 8/2014 | Fox | ................ | H03K 19/017509 375/259 |

OTHER PUBLICATIONS

Knuth, Donald E., "Generating All Combinations and Partitions," *The Art of Computer Programming*, Pre-Fascicle 3A, Jun. 13, 2002, Section 7.2.1.3, pp. 1-35 (38 pages total), Addison-Wesley.
Widmer, A. X. et al., "A DC-Balanced, Partitioned Block, 8B/10B Transmission Code," *IBM Journal of Research and Development*, Sep. 1983, pp. 440-451, vol. 27, Issue 5, IBM Research Division, Yorktown Heights, New York, USA.

* cited by examiner

*Primary Examiner* — Nimesh G Patel
(74) *Attorney, Agent, or Firm* — W. Eric Webostad

(57) ABSTRACT

An apparatus relating generally to encoding is disclosed. This apparatus includes a bus interface for communicating information from a first die including the bus interface to a second die. A first portion of a bus associated with the bus interface is associated with data bits. A second portion of the bus associated with the bus interface is associated with encoding bits. The bus interface is configured to encode a data word to provide an encoded word. The encoded word is associated with a combinatorial number system.

18 Claims, 9 Drawing Sheets

| N 241 | R 401 | C(N,r) 402 | k 242 | Coding Density 403 | Wiring Overhead 404 |
|---|---|---|---|---|---|
| 4 | 2 | 6 | 3 | 75.0% | 33.3% |
| 5 | 2 | 10 | 4 | 62.5% | 25.0% |
| 6 | 3 | 20 | 5 | 62.5% | 20.0% |
| 7 | 3 | 35 | 6 | 54.7% | 16.7% |
| 8 | 4 | 70 | 7 | 54.7% | 14.3% |
| 9 | 4 | 126 | 7 | 98.4% | 28.6% |
| 10 | 5 | 252 | 8 | 98.4% | 25.0% |
| 11 | 5 | 462 | 9 | 90.2% | 22.2% |
| 12 | 6 | 924 | 10 | 90.2% | 20.0% |
| ⋮ | ⋮ | ⋮ | ⋮ | ⋮ | ⋮ |
| 41 | 20 | 2.69E+11 | 38 | 97.9% | 7.9% |
| 42 | 21 | 5.38E+11 | 39 | 97.9% | 7.7% |
| ⋮ | ⋮ | ⋮ | ⋮ | ⋮ | ⋮ |
| 163 | 81 | 7.27E+47 | 159 | 99.5% | 2.5% |
| 164 | 82 | 1.45E+48 | 160 | 99.5% | 2.5% |
| ⋮ | ⋮ | ⋮ | ⋮ | ⋮ | ⋮ |

| Decimal | c5 | c4 | c3 | c2 | c1 | b9 | b8 | b7 | b6 | b5 | b4 | b3 | b2 | b1 | b0 |
|---|---|---|---|---|---|---|---|---|---|---|---|---|---|---|---|
| 251 | 9 | 8 | 7 | 6 | 5 | 1 | 1 | 1 | 1 | 1 | 0 | 0 | 0 | 0 | 0 |
| 250 | 9 | 8 | 7 | 6 | 4 | 1 | 1 | 1 | 1 | 0 | 1 | 0 | 0 | 0 | 0 |
| 249 | 9 | 8 | 7 | 6 | 3 | 1 | 1 | 1 | 1 | 0 | 0 | 1 | 0 | 0 | 0 |
| 248 | 9 | 8 | 7 | 6 | 2 | 1 | 1 | 1 | 1 | 0 | 0 | 0 | 1 | 0 | 0 |
| • • • |  |  |  |  |  |  |  |  |  |  |  |  |  |  |  |
| 3 | 5 | 4 | 3 | 1 | 0 | 0 | 0 | 0 | 0 | 1 | 1 | 1 | 0 | 1 | 1 |
| 2 | 5 | 4 | 2 | 1 | 0 | 0 | 0 | 0 | 0 | 1 | 1 | 0 | 1 | 1 | 1 |
| 1 | 5 | 3 | 2 | 1 | 0 | 0 | 0 | 0 | 0 | 1 | 0 | 1 | 1 | 1 | 1 |
| 0 | 4 | 3 | 2 | 1 | 0 | 0 | 0 | 0 | 0 | 0 | 1 | 1 | 1 | 1 | 1 |

FIG. 7

| Decimal | b9 | b8 | b7 | b6 | b5 | b4 | b3 | b2 | b1 | b0 |
|---|---|---|---|---|---|---|---|---|---|---|
| 255 | 1 | 1 | 1 | 1 | 1 | 0 | 0 | 0 | 0 | 0 |
| 254 | 1 | 1 | 1 | 1 | 0 | 1 | 0 | 0 | 0 | 1 |
| 253 | 1 | 1 | 1 | 1 | 0 | 0 | 1 | 0 | 0 | 1 |
| 252 | 1 | 1 | 1 | 1 | 0 | 0 | 0 | 1 | 0 | 1 |

CODING USING A COMBINATORIAL NUMBER SYSTEM

TECHNICAL FIELD

The following description relates to integrated circuit devices ("ICs"). More particularly, the following description relates to coding using a combinatorial number system for an IC.

BACKGROUND

Silicon interposer wires above 3 mm typically exhibit some degree of inductive behavior. Current through a wire induces a magnetic field across adjacent wires and introduces inductive noise. Return current paths may be provided for optimal signal integrity. In single-ended signaling, the worst-case scenario is when all bits of a bus flip in the same clock cycle. One way to provide a return current path is to use differential signaling. A pair of wires are used for every symbol to be transmitted. For instance, in non-return-to-zero ("NRZ") differential signaling, to transmit a logic 1, one wire is at a high-voltage level while the other is at ground. To transmit a logic 0, the two wires swap voltage values. As a result, any signal transition results in equal and opposite currents on the two wires. NRZ differential signaling is currently used on printed circuit boards ("PCBs") for high-speed signaling with serializers-deserializers ("SERDES"). While differential signaling is effective in providing return current paths, the wiring over head is 100% since every bit requires two wires to transmit.

It would be useful to provide less digital noise with less overhead than differential signaling.

SUMMARY

An apparatus relates generally to encoding. In such an apparatus, a bus interface is for communicating information from a first die to a second die. A first portion of a bus of the bus interface is associated with data bits. A second portion of a bus of the bus interface is associated with encoding bits. The bus interface is configured to encode a data word to provide an encoded word. The encoded word is associated with a combinatorial number system.

An apparatus relates generally to decoding. In such an apparatus, a bus interface is for receiving information from a first die by a second die including the bus interface. A first portion of a bus associated with the bus interface is associated with data bits. A second portion of the bus associated with the bus interface is associated with encoding bits. The bus interface is configured to decode an encoded word to provide a data word. The encoded word is associated with a combinatorial number system.

A method relates generally to encoding. In such a method, a data word is obtained by an encoder of a bus interface of a first die. The data word is encoded with the encoder to provide an encoded word. The encoded word is encoded with a code associated with a combinatorial number system. The encoding includes replacing the data word with at least a nearly-constant-weighted word to provide the encoded word. The encoded word is transmitted over a bus to a second die. The encoder is configured to encode the data word according to an $$\binom{N}{r}$$

code for the code associated with the combinatorial number system for N a bus width of the bus and for r a weight of the code to provide the encoded word.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block diagram of a perspective view depicting an exemplary stacked die assembly.

FIG. 1-3 is a block diagram of a perspective view depicting a cross-section of an IC die of FIG. 1-2.

FIG. 1-4 is a block diagram of a top elevation view of the stacked die assembly of FIG. 1-2.

FIG. 2 is a block diagram depicting an exemplary stacked die assembly.

FIG. 3 is a flow diagram depicting an exemplary encoding-decoding flow.

FIG. 4 is a table diagram depicting a list of combinatorial number system ("CNS") codes.

FIG. 6 is a table diagram depicting an exemplary CNS code table for a $$\binom{N}{r}$$

code.

FIG. 7 is a table diagram depicting an exemplary portion of a CNS code table that may be combined with the CNS code table of FIG. 6.

Figure 8:
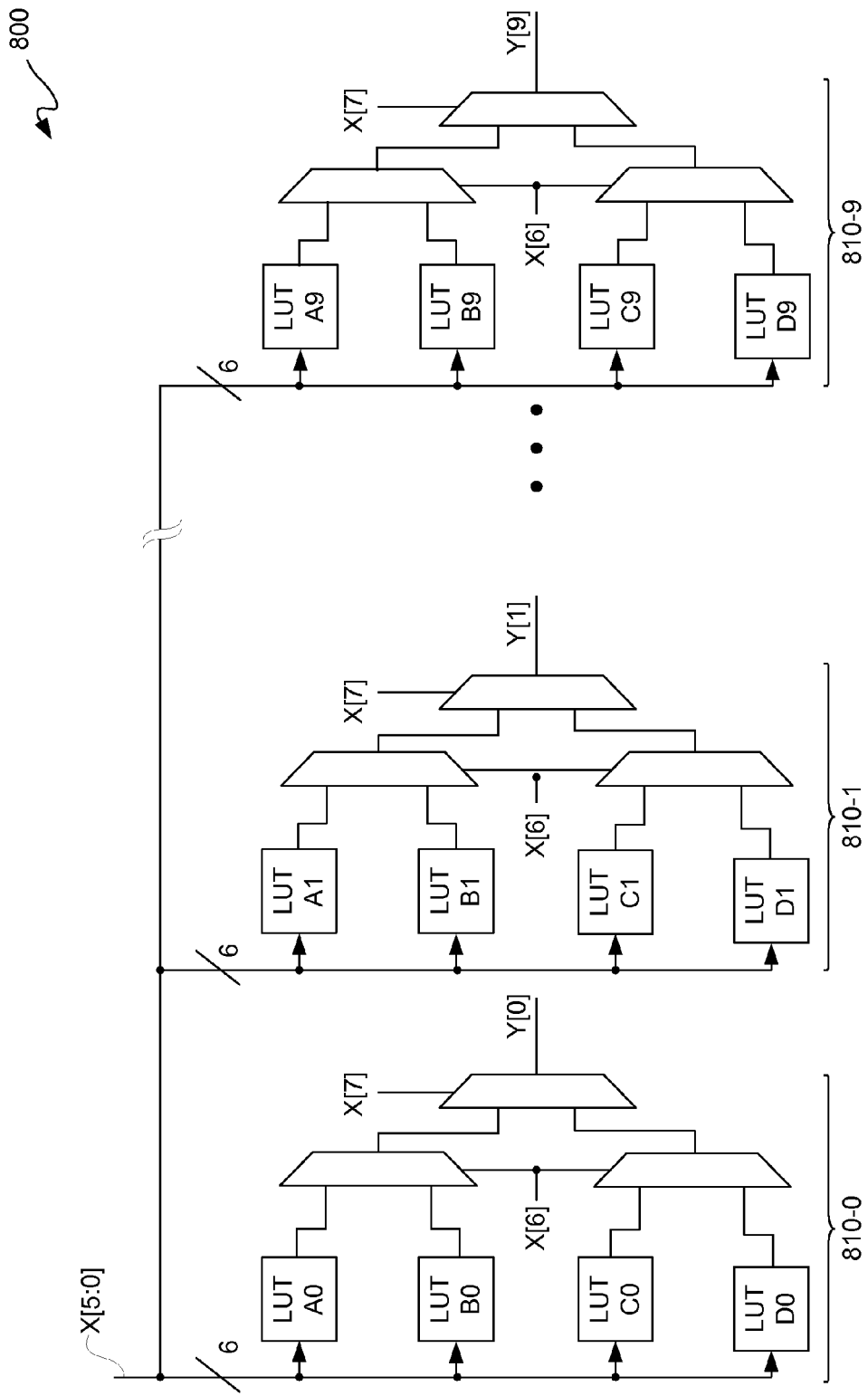

FIG. 8 is a block/circuit diagram depicting an exemplary encoder.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

As described below in additional detail, wiring overhead may be reduced while providing return current paths by generalizing differential signaling into constant-weight signaling. In differential signaling, one of two wires is always at a high-voltage value. For a set of 2M wires, M wires are always at the high-voltage value ('1' or "logic 1") and the other M wires are always at ground ('0' or "logic 0"). The "weight" of the 2M-bit code, i.e. the number of 1's, is the constant value M. As described below in additional detail, an encoding of binary values, and decoding thereof, to a constant-weight or near-constant-weight code is described to improve signal integrity across an inter-die wiring interface, while reducing wiring overhead.

Along those lines, a low-overhead encoding is described for inter-die interfaces on a passive silicon interposer. Using a nearly-constant-weight code or a constant-weight code to minimize or remove transition imbalance (e.g., a difference in rising vs. falling transitions). Additionally, a specific C(10, 5) combinatorial number system code is identified, which may be used to encode 252 words each with a code weight of 5. Moreover, such code may be augmented with 4 additional words with a code weight of 4 or 6 to make such coding a power of 2. This code may be judiciously used for long inter-die traces, particularly for heterogeneous stacked silicon in which the two dies have different linear bandwidth densities (i.e., an amount of traffic across an edge of a die). Additionally, C(10,5)-encoded values may be stored in a separate memory (e.g. DRAM) die on an interposer without such memory die having to have a C(10,5) encoder or decoder or encoder-decoder ("CODEC").

With the above general understanding borne in mind, various exemplary structures and methods for encoding and decoding are generally described below.

Because one or more of the above-described examples are described herein using a particular type of IC, a detailed description of such an IC is provided below. However, it should be understood that other types of ICs may benefit from one or more of the techniques described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
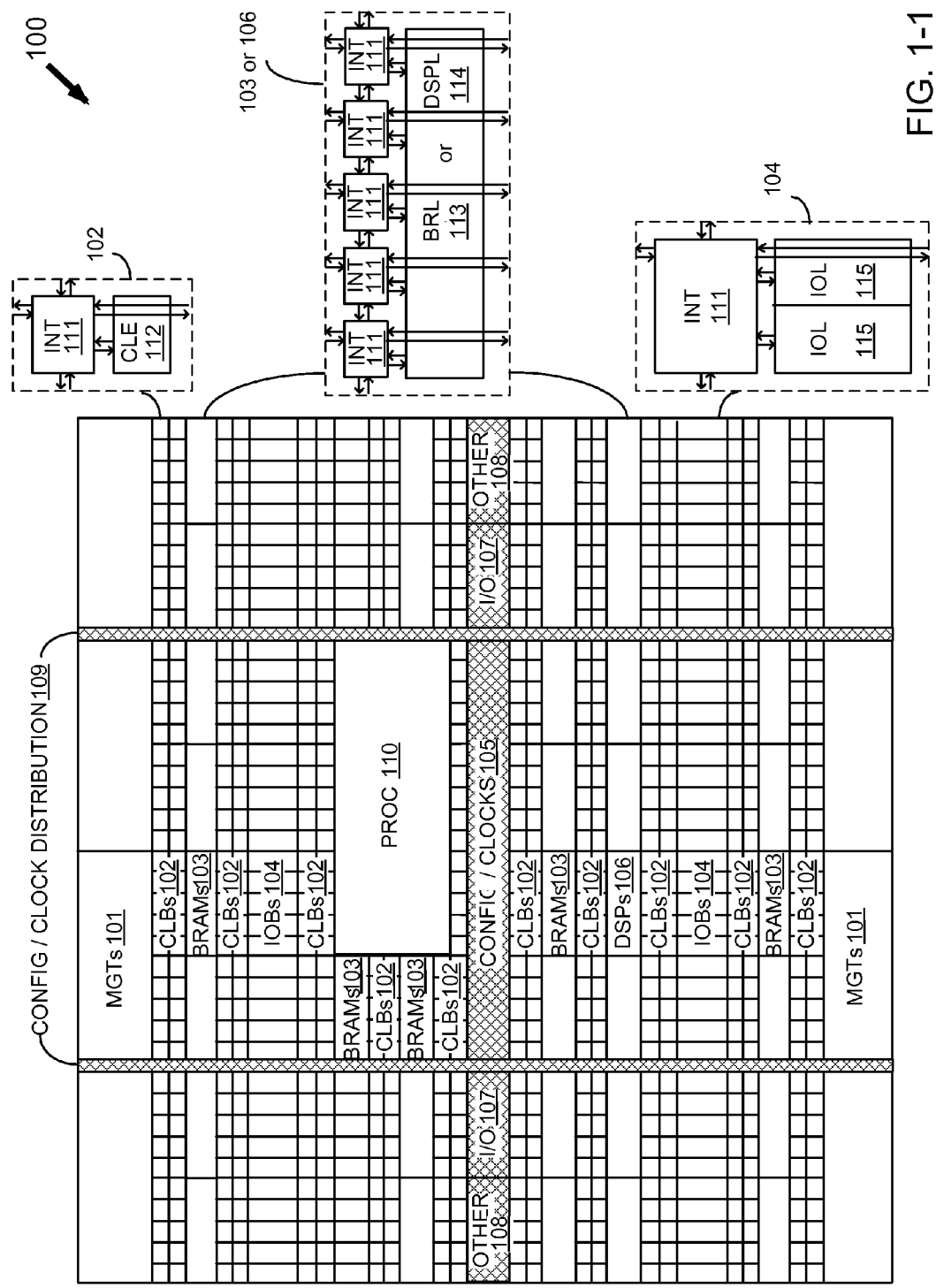
FIG. 1-1 is a simplified block diagram depicting an exemplary columnar Field Programmable Gate Array ("FPGA") architecture.

As noted above, advanced FPGAs can include several different types of programmable logic blocks in the array. For example, FIG. 1-1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1-1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured example, a horizontal area near the center of the die (shown in FIG. 1-1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1-1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1-1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1-1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figures 1, 2:
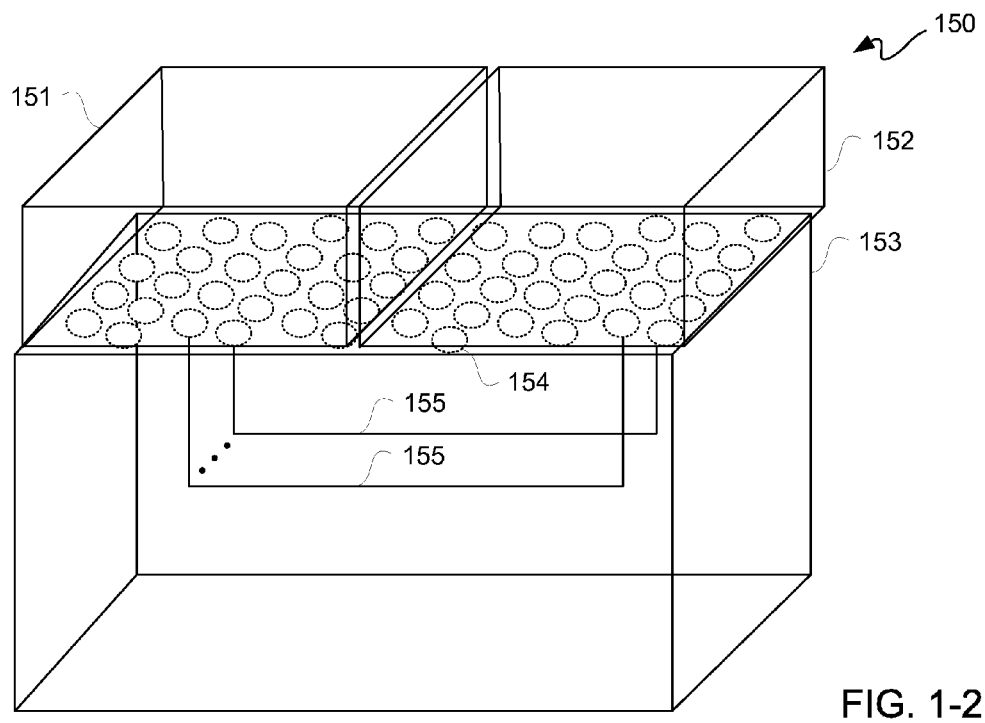

FIG. 1-2 is a block diagram of a perspective view depicting an exemplary stacked die assembly 150. Assembly 150 includes a first integrated circuit ("IC") die 151 and a second IC die 152 coupled to an interposer 153. Micro pads and microbumps, as generally indicated with dotted balls 154, may be used for coupling IC dies 151 and 152 to interposer 153, as is known. Furthermore, wires or traces 155 may be formed in or on interposer 153 for interconnecting IC dies 151 and 152.

Figures 1, 2, 3:
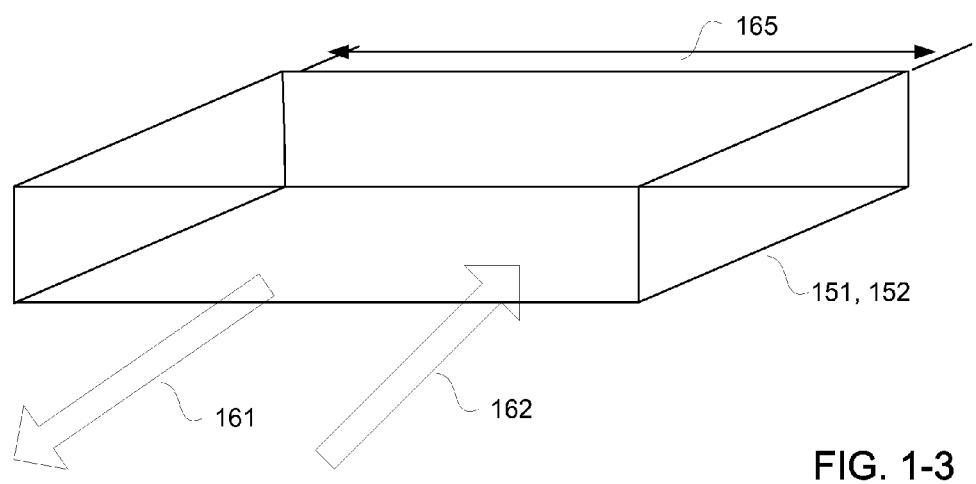

FIG. 1-3 is a block diagram of a perspective view depicting a cross-section of an IC die 151 or 152 of FIG. 1-2. IC die 151 or 152 may have a cross-sectional width, W, 165 Signals 162 input to an IC die 151 or 152 may have a bandwidth, B1, which is more than 1 gigabit per second (Gbps). Signals 161 output from an IC die 151 or 152 may have the bandwidth, B2, which is more than 1 Gbps. Along those lines, a cross-sectional bandwidth density, CBD, may be equal to the sum of B1 plus B2 divided by W.

FIG. 1-4 is a block diagram of a top elevation view of stacked die assembly 150 of FIG. 1-2. In this example, IC die 151 has a smaller area than IC die 152. Along those lines, IC die 151 may have a dense microbump pad matrix 171, and a high CBD associated therewith. IC die 152 may have a less dense microbump pad matrix 172 than density of microbump pad matrix 171. Along those lines, CBD of microbump pad matrix 172 may be less than CBD of microbump pad matrix 171. These differences may result in longer inter-die traces 173 and 174 such that fanout/fanin between IC dies 151 and 152 generally have matching bandwidths. Accordingly, because different IC dies may have different bandwidth densities, routes between such dies may be longer in order to adjust for such mismatch in bandwidth densities.

FIG. 2 is a block diagram depicting an exemplary stacked die assembly 200. Stacked die assembly 200 includes interposer 203, IC die 201, and IC die 202. Even though a stacked die assembly 200 is described, in another example interposer 203 may be replaced with a printed circuit board ("PCB") 203. However, for purposes of clarity by way of example not limitation, it shall be assumed that an interposer 203 is used.

IC die 201 includes a bus interface 205. Bus interface 205 may include an encoder 210 and an output driver block 212 coupled to one another for communication of an encoded word from encoder 210 to output driver block 212 for sending or transmitting via a bus 215. Encoder 210 optionally may be part of a coder-decoder ("CODEC") 203. Along those lines, such a CODEC 203 may optionally include a decoder along with an associated input driver block. However, for purposes of clarity by way of example not limitation, only encoder 210 and output driver block 212 are described, as use of a CODEC 203 will be understood from the following description.

IC die 202 includes a bus interface 206. Bus interface 206 may include a decoder 220 and an input driver block 222 coupled to one another for communicating an encoded word received from bus 215 by input driver 222 for providing to decoder 220 for decoding. Likewise, decoder 220 may optionally be part of a CODEC 204 having an encoder. Again, for purposes of clarity by way of example not limitation only decoder 220 an input driver block 222 are described, as use of a codec 204 will be understood from the following description.

Even though only a single bus interface 205 and a single bus interface 206 are illustratively depicted for purposes of clarity, more than single instances of such interfaces may be employed. Furthermore, even though bandwidth densities of IC die 201 and 202 may appear to be equal as illustratively depicted, such bandwidth densities may be equal or unequal, such as previously described.

Interposer 203, as well as output driver 212 of bus interface 205 and input driver 222 of bus interface 206, may have a bus 215. Again, even though only a single bus is described, interposer 203 may have multiple instances of buses. Bus 215 having N traces or bits 241 may be used for inter-die interconnecting of output driver 212 to input driver 222. In this example, it shall be assumed that bus 215 has a portion of traces 216 that are used to transmit encoded data signals or bits and has a portion of traces 217 that are used to transmit encoding signals or bits to input driver 222. In this example, bus 215 is illustratively depicted for a type of signaling which is not differential for inter-die transmission of an encoded word. This non-differential signaling may be used to reduce a total number of wires or traces used for inter-die communication as compared with differential signaling for example. However, in another example, bus 215 may be configured for differential signaling, as a code as described below in additional detail may be beneficial for non-differential signaling, such as single-ended signaling, as well as differential signaling, in reducing bit transition or digital noise.

Data or other information ("a data word") may be input to encoder 210 via an input data bus 211 for encoding to provide an encoded word therefor. Input data bus 211 may have k traces or bits 242. After decoding an encoded word by decoder 220, data or other information, namely a decoded data word, may be output from decoder 220 via an output data bus 221. Output data bus 221 may have k traces or bits 242. Bit widths of buses 211 and 221 therefore may be the same. Along those lines, an encoder-decoder communication channel for communicating information from IC die 201 to IC die 202 may be a k-to-N-to-k bit communication channel for N greater than k.

Encoder 210 may be configured to encode a data word using a combinatorial number system. Along those lines, in this example, there are eight encoded data bits 216 and two encoding bits 217 for a total of 10 bits, where N is equal to 10. However, N in other examples may have a different value, as will be further appreciated from the following description.

Encoder 210 of bus interface 205 may be configured to provide a constant-weight encoding of an input data word 211 of k bits 242 to provide an N bit encoded word. Such an encoded word may represent such a data word by a member of a set of unique combinations bits selected, as described below in additional detail. Each member of such set of unique combinations of bits has an equal number of logic 1s and logic 0s. A total of all members of such a set may not be a power of 2.

In another configuration of encoder 210, encoder 210 of bus interface 205 may be configured to provide a nearlyconstant-weight encoding of an input data word 211 of k bits 242 to provide an N bit encoded word. Such an encoded word may represent such a data word by a member of a set of unique combinations of bits selected, as described below in additional detail. A substantial majority (i.e., at least two thirds, and more than 90 percent in some applications) of members of such set of unique combinations of bits have an equal number of logic 1s and logic 0s. A total of all members of such set may be a power of 2.

Encoder 210 is configured to encode a data word according to an $$\binom{N}{r}$$

code of a combinatorial number system ("CNS") for N a bus width of a bus 215 and for r a weight of such code to provide an encoded word. This generally means given N bits, r bit may be chosen from such N bits to form a number of different or unique combinations. Encoder is a k-to-N encoder for k a length of such data word, where k is less than bus width N and greater than weight r of such code.

In an $$\binom{N}{r}$$

combinatorial number system, a number x may be represented as a string of r digits $c_r, c_{r-1}, c_{r-2}, \ldots c_1$, where x may be generally expressed as follows:

$$x = \binom{N}{c_r} + \binom{N}{c_{r-1}} + \binom{N}{c_{r-2}} + \ldots + \binom{N}{c_1}, \quad (1)$$

where $C_r > C_{r-1} > C_{r-2} > \ldots C_1 \geq 0$. Along those lines, an $$\binom{N}{r}$$

code or CNS number may be written in binary form, where such number always has exactly r logic 1s. The weight of this code is therefore the constant r, namely a constant-weight code. For a code, there may be a binary representation of a set of numbers such that each member or number in such set has the same number of logic 1s. A resulting code has 0 transition imbalance because any bit that changes always results in an equal and opposite transition. For example, a weight-3 code may have values change from 001011 to 110100.

FIG. 3 is a flow diagram depicting an exemplary encoding-decoding flow 300 in accordance with the above description. However, prior to a detailed description of encoding-decoding flow 300, a more detailed description of CNS encoding and decoding is provided below.

Figures 1, 2, 3, 4:
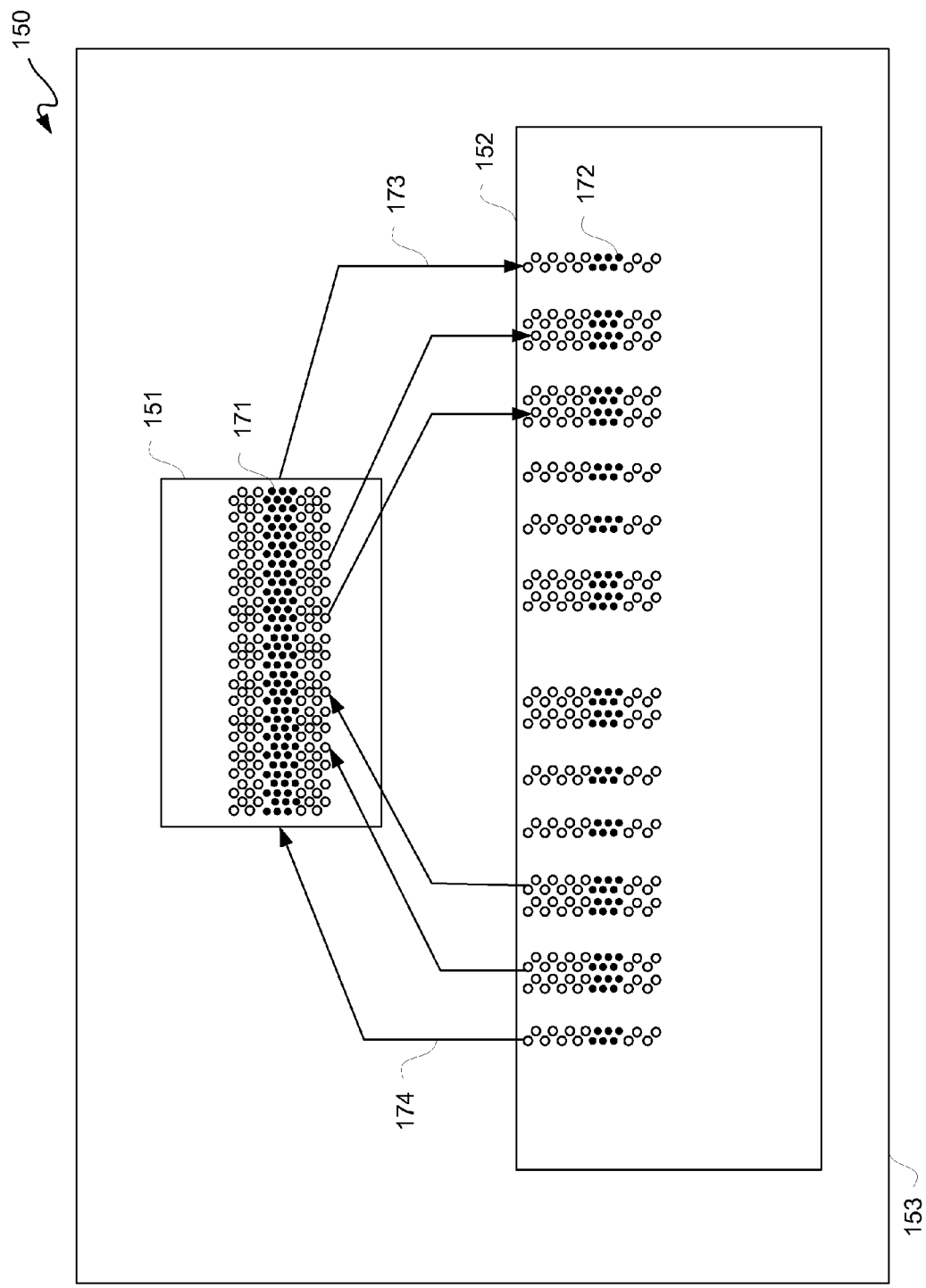
Figure 2:
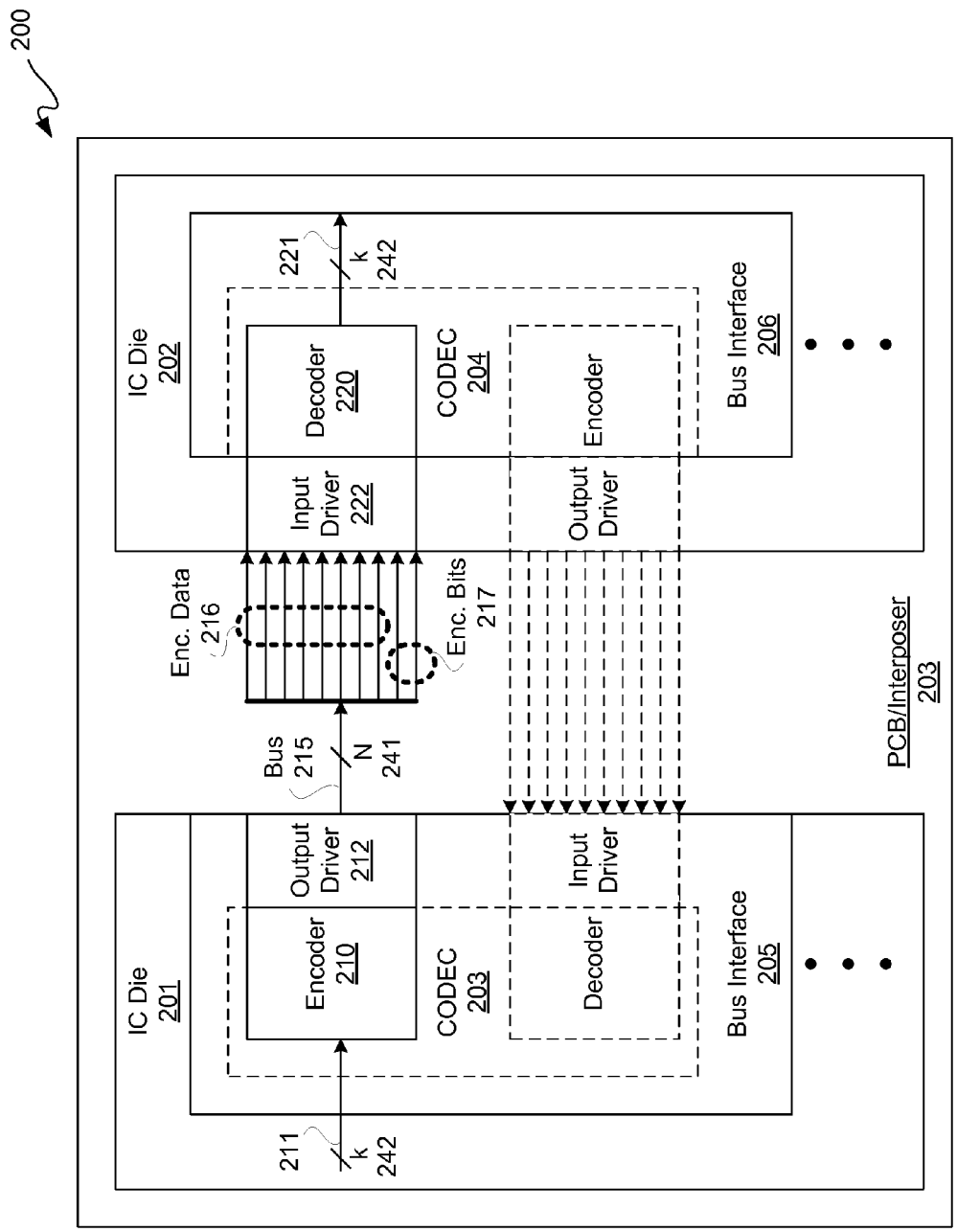
Figure 3:
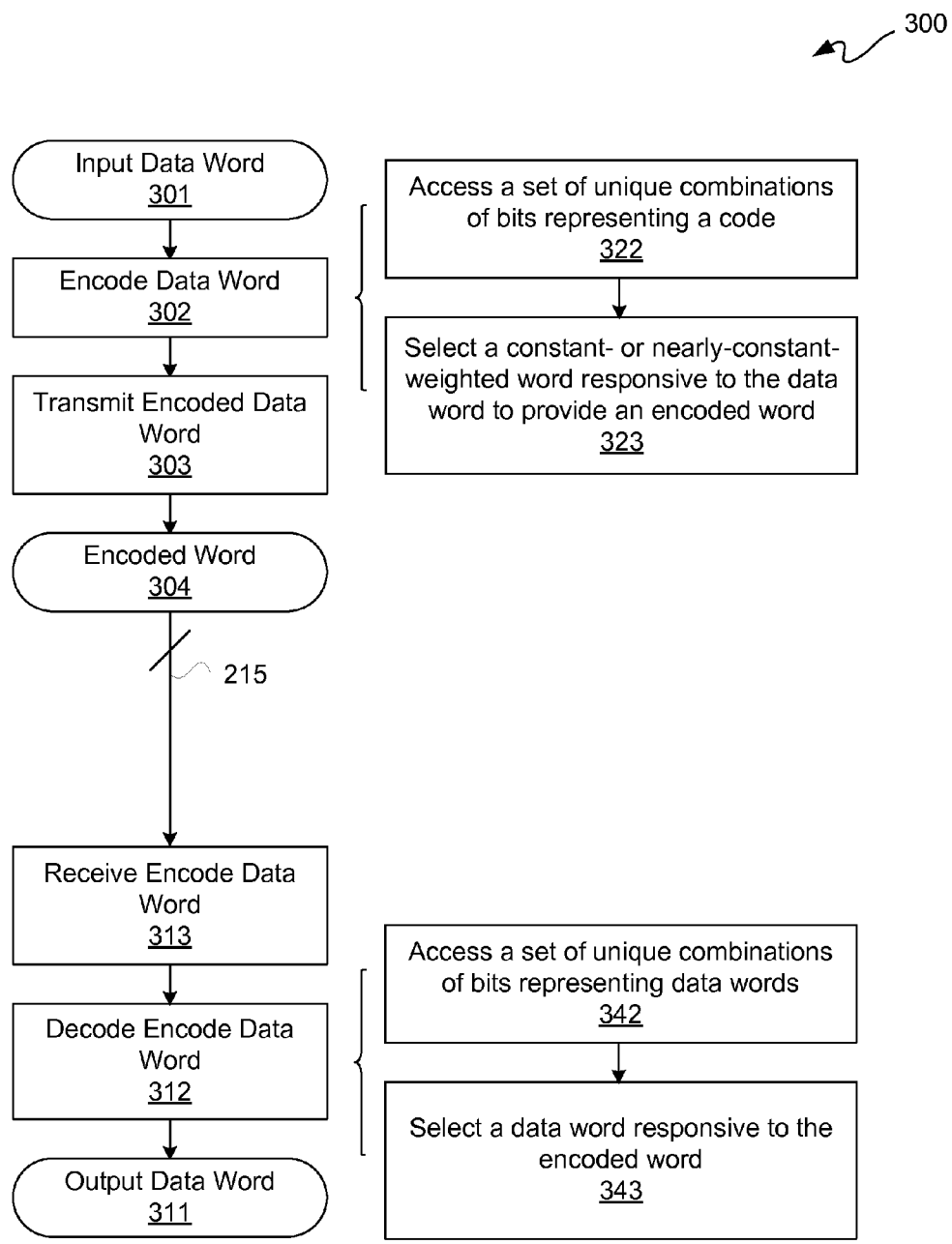

FIG. 4 is a table diagram depicting a list 400 of CNS codes. List 400 includes a column for bus width N 241, code weight r 401, maximum number of same constant-weight members in a CNS code C(N, r) 402, data word width k 242, coding density 403, and wiring overhead 404. For purposes of clarity by way of example not limitation, a code 410 is selected, even though this or another code in accordance with the description herein may be used. Code 410, which is a $$\binom{10}{5}$$

code, may be selected because it has a total number of 252 members. This number, though not a power of two, it is close to 256, which is a power of two, namely 2^8. For code 410, data word width k 242 may be 8 for such code, where 2^k equals 256. In other words, in a $$\binom{10}{5}$$

code, ail members in a set of numbers for such code may have exactly 5 logic ones in binary, which means a total of members 252 in a $$\binom{10}{5}$$

code may be represented with a weight of 5. For example, a decimal number or numeral 250 may be represented in CNS as 98764 (e.g., a concatenation of 98764 and not the decimal number 98764), where $(c_5, c_4, c_3, c_2, c_1)$ equals (9, 8, 7, 6, 4), or, stated another way, using equation 1 above:

$$250 = \binom{10}{9} + \binom{10}{8} + \binom{10}{7} + \binom{10}{6} + \binom{10}{4}.$$

For a binary representation, a digit $c_i$ indexes a bit that is a logic 1. All other bits are logic 0. Continuing the above example, a binary representation of a CNS number 98764 (i.e., 250 in decimal form) is 1111010000 in binary form. From such binary form it may be observed that bits in bit positions 9, 8, 7, 6, and 4 are all logic 1 and all other bit positions are logic 0. Thus, $c_i$ may be used as indices or pointers to which bits are to be set to a logic 1 in a set of N bits. For a $$\binom{10}{5}$$

code, it decimal numbers from 0 to 251, namely 8-bit binary numbers from 00000000 to 11111011, may be encoded as 10-bit CNS binary numbers of weight 5.

An $$\binom{N}{r}$$

CNS code can represent up to an $$\binom{N}{r}$$

unique numbers within a set thereof. To maximize the set of numbers represented in an $$\binom{N}{r}$$

CNS code, code weight r may be selected such that:

$r = \lfloor N/2 \rfloor$ or $\lceil N/2 \rceil$, where brackets indicated floor and ceiling operations.

For example, for N equal to 10, maximum unique numbers in a set for different weights r may be used to identify a value of interest, as follows:

$$\binom{10}{1} = 1, \binom{10}{2} = 45, \binom{10}{3} = 120, \binom{10}{4} = 210, \binom{10}{5} = 252,$$

$$\binom{10}{6} = 210, \ldots, \text{or } \binom{10}{10-k} = \binom{10}{k}.$$

In other words, for N equal to 10 bits, a $$\binom{10}{5}$$

code may be used to obtain a maximum number of unique numbers of equal weighting, namely in this example 252 unique numbers or members of a set where each has a weight of 5.

Coding density 403 of a $$\binom{10}{5}$$

code may be 98.4% (i.e., 63/64), where a CNS coding density is defined equal to:

$$\frac{\binom{N}{r}}{2^{\lceil \log_2 \binom{N}{r} \rceil}}.$$

This CNS coding density number basically indicates how close a set of combinations of N choose r combinations is close to a power of 2. Furthermore, wiring overhead 404, namely encoding bit traces 217 in addition to data bit traces 216 of an N bit 241 encoded word, for a $$\binom{10}{5}$$

code may be 25.0% (i.e., (10/8)−1), where CNS wiring overhead is defined as equal to:

$$\frac{N}{\lceil \log_2 \binom{N}{r} \rceil}.$$

Wiring overhead is generally defined in comparison to a comparable single-ended data bus. Thus, 8 bits transmitted in a single-ended encoded signal, either in serial-parallel or parallel, would involve 8 wires, to which an N equal to 10 bit bus may be compared for example.

Figure 5:
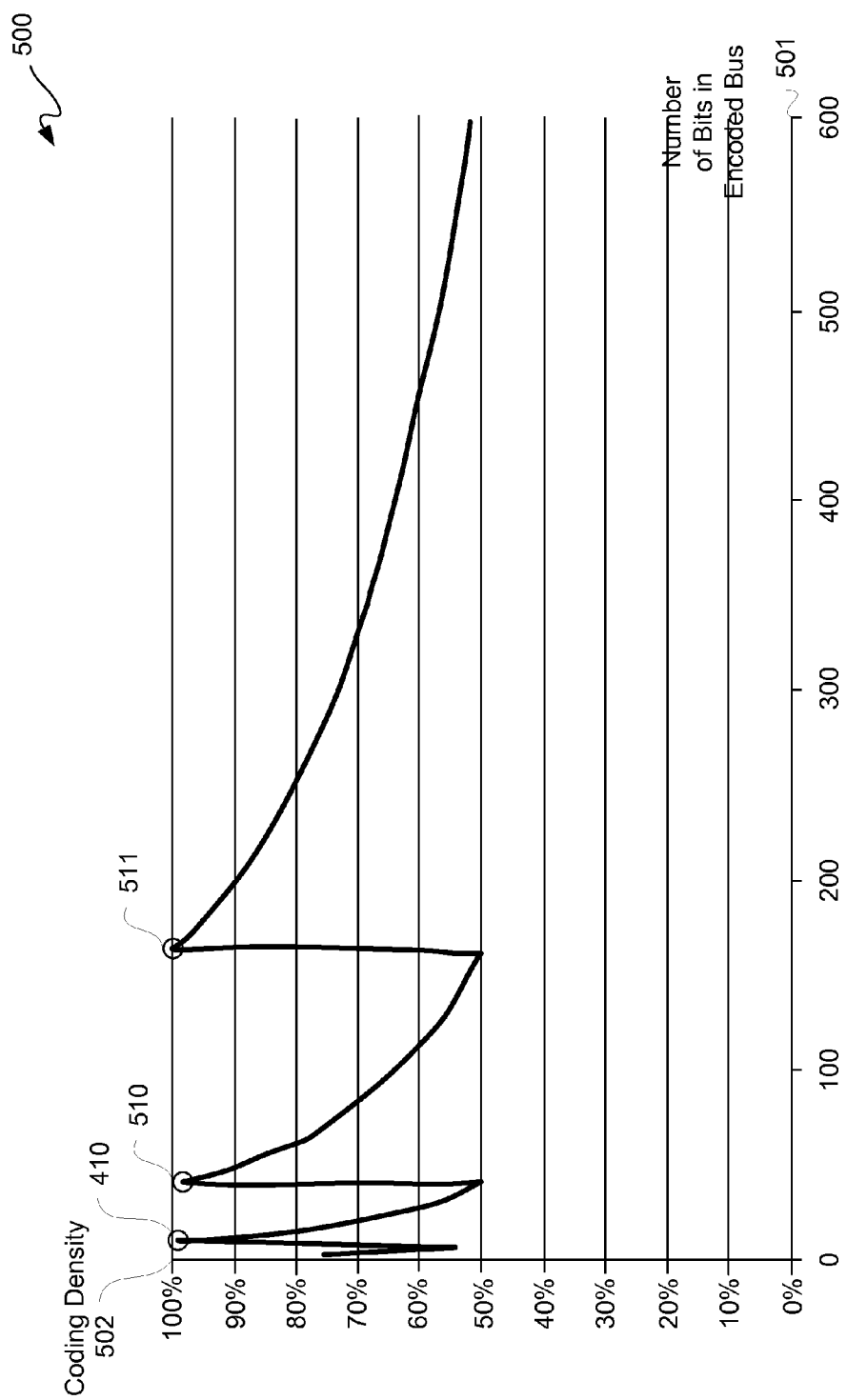
FIG. 5 is a graph depicting exemplary CNS coding densities for a number of bits in an encoded bus.

CNS coding density 403 is defined in terms of a power of 2. For example, for a $$\binom{10}{5}$$

code, where K is equal to 8, 98.4% of the numbers in such code may have a same weight (i.e., r=5) as compared to a power of $2^k$ (i.e., 256). However, even though an example of a $$\binom{10}{5}$$

code is used, it should be understood that other CNS codes may be used in accordance with the description herein. Along those lines, FIG. 5 is a graph depicting exemplary CNS coding densities 502 for a number of bits 501 in an encoded bus, such as bus 215 for example. Along those lines, for larger bus widths, codes 510 or 511 for example may be considered, as these codes have correspondingly high coding densities. Code 510 is a $$\binom{41}{20}$$

code for k equal to 38, and code 511 is a $$\binom{163}{81}$$

code for k equal to 159. Additionally, other codes that may be used include $$\binom{42}{21}$$

for k equal to 39, and $$\binom{164}{82}$$

for k equal to 160, among others.

FIG. 6 is a table diagram depicting an exemplary CNS code table 600 for a $$\binom{10}{5}$$

code. Column 601 indicates decimal values. Columns 602 indicate bit values for bit positions 0 through 9, such as of bus 215. Bit values of rows associated with columns 602 are for a 10-bit constant-weight code, namely a set of unique members or numbers with equal amounts of logic 1s and 0s in each number. Columns 603 represent CNS values associated with decimal numbers for digit $c_i$ indexes for i from 1 to 5. Indices in a row associated with columns 603 indicate which bits in a corresponding row in column 602 are to be logic 1s. Along those lines, a decimal value associated with the data word may be encoded with a 10 bit encoded word, where such encoded word is obtained from a set of unique combinations of bits.

Decimal values in column 601 are not equivalent to a power of 2 number. To provide a set of decimal values that is equivalent to a power of 2 number, CNS values for decimal numbers 252 through 255 may be added. For example, FIG. 7 is a table diagram depicting an exemplary portion of a CNS code table 700. CNS code table 700 may be added to CNS code table 600 to provide a set of decimal values whose total number of members is a power of 2. Even though a $$\binom{10}{6}$$

code is used to represent these additional values in table 700, this CNS code and/or another CNS code or one or more other CNS codes may be used to provide these additional values. Along those lines, 4 out of 256 code words are not constant-weight code words, because a $$\binom{10}{5}$$

CNS code can only represent 252 code words of weight 5. These four additional code words can be assigned a weight to minimize transition and balance, such as a weight of 6 and/or 4. The combination of tables 600 and 700 results in a nearly-constant-weight code with 252 CNS numbers of weight 5 and 4 CNS numbers of weight 6. However, it should be understood that an encoded word may be obtained from a set of unique combinations of bits in such nearly-constant-weight code, where a substantial majority of members of such set of unique combinations of bits has an equal number of logic 1s and logic 0s.

At this point, it should be understood that by providing a constant weight code or nearly constant weight code using a CNS, an adjustment is effectively made in space, not in time. In other words, for a constant-weight code, transitions within a same clock cycle are balanced, and this balancing is done in space as opposed to balancing between clock cycles.

With renewed reference to FIG. 3, where there is shown a flow diagram depicting an exemplary encoding-decoding flow 300 in accordance with the above description, encoding-decoding flow 300 is further described with simultaneous reference to FIGS. 2 through 7.

An input data word 301 may be obtained such as via data bus 211. At 302, such input data word 301 is encoded, such as with encoder 210. To encoded data word 301 at 302, at 322, a set of unique combinations of bits representing a code may be accessed or generated, such as by accessing one or more tables or by generating with a hardware encoder. For purposes of clarity by way of example not limitation, it shall be assumed that a table is used. Thus, for example, at 322, a set of unique combinations of bits representing a code may be accessed such as from table 600 or a combination of table 600 and 700. Such access may be from columns 602 for a row thereof corresponding to such data word, where data word 301 may be used as a pointer into such table. Furthermore, for such encoding at 302, at 323, a constant-weighted code word or a nearly-constant-weighted code word may be selected responsive to data word 301 to provide an encoded word 304, namely where such encoded word 300 for has a constant weight or a nearly constant weight. Along those lines, encoder 210 may be configured to encode data word 301 according to an $$\binom{N}{r}$$

code using a combinatorial number system for N a bus width of bus 215 and for r a weight of such code. Encoder 210 may be a k-to-N encoder for k a length of data word 301, where data word length is less than bus width and greater than code weight. At 303, such encoded data word may be transmitted or otherwise sent over bus 215 to decoder 220, such as previously described.

A received encoded word 304 may be obtained or otherwise received such as via bus 215 at 313. At 312, such received encoded word 304 may be decoded, such as with decoder 220. To decode an encoded word at 312, at 342 a set of unique combinations of bits representing data words may be accessed or generated, such as by accessing one or more tables or by generating with a hardware decoder. For purposes of clarity by way of example not limitation, it shall be assumed that a table is used. Thus, for example, at 342, a set of unique combinations of bits representing a code may be accessed such as from table 600 or a combination of table 600 and 700. Such access may be by using encoded word 304 as a pointer into a table, such as from columns 602 for a row thereof corresponding to such encoded word. Furthermore, for such decoding at 312, at 343, a constant-weighted code word or a nearly-constant-weighted code word encoded word 304 may be used to select a data word for output at 311, such as via output data bus 221. Along those lines, decoder 220 may be coupled to receive encoded word 304 and configured to decode such encoded word to provide data word 301 for output at 311. Along those lines, decoder 220 may be configured to decode encoded word 304 encoded according to an $$\binom{N}{r}$$

code using a combinatorial number system for N a bus width of bus 215 and for r a weight of such code. Decoder 220 may be an N-to-k decoder for k a length of data word 301, where data word length is less than bus width and greater than code weight.

FIG. 8 is a block/circuit diagram depicting an exemplary encoder 800. Encoder 800 may be used for encoder 210. For purposes of clarity by way of example not limitation, it shall be assumed that encoder 800 is formed using programmable resources of FPGA 100 of FIG. 1, where FPGA 100 has six input LUTs A0-A9, B0-B9, C0-C9, and D0-D9 each of which is coupled to receive 6 bits of a data word, X, namely X[5:0]. However, it should be understood that other types or configurations of encoders may be used in accordance with the description herein. Encoder 800 is a 8-to-10 encoder for mapping an eight-bit dense binary word X into a 10-bit constant-weight or nearly-constant-weight word using a $$\binom{10}{5}$$

CNS code. Each LUT in encoder 800 may be a 64-bit look-up table, mapping a 6-bit input (64 combinations) to one output bit. The other two bits, X[6] and X[7], of data word X are used to provide respective multiplexer control select signals for encoding. Such LUTs and multiplexers may effectively be programmed according to table 600 or a combination of tables 600 and 700 to produce an output Y. In other words, each encoding block 810-0 through 810-9 receives a data word X[7:0], and each such encoding block outputs a corresponding output bit of Y[9:0] of a CNS encoded word. A decoder may be an inverse of encoder 800.

A CNS code as described herein having a constant weight or nearly constant weight may have substantially less traces than dense differential encoding. Furthermore, such constant-weight or nearly-constant-weight code may have fewer logic 0 to 1 transitions and/or fewer logic 1 to 0 transitions than dense single-ended encoding and/or dense differential encoding. Furthermore, a CNS code as described herein may have less transition imbalance (e.g., rising minus falling) than dense single-ended encoding. Thus, a CNS code as described herein may produce less di/dt noise, digital noise, or other noise than single-ended encoding with less wire overhead than differential encoding.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. An apparatus, comprising:
a bus interface for communicating information from a first die including the bus interface to a second die;
wherein a first portion of a bus associated with the bus interface is associated with data bits;
wherein a second portion of the bus associated with the bus interface is associated with encoding bits;
wherein the bus interface is configured to encode a data word to provide an encoded word;
wherein the encoded word is associated with a combinatorial number system; and
wherein the bus interface comprises:
an encoder coupled to receive the data word and configured to encode the data word to provide the encoded word; and
the encoder being further configured to encode the data word according to an $$\binom{N}{r}$$

code using the combinatorial number system for N a bus width of the bus and for r a weight of the code to provide the encoded word.

2. The apparatus according to claim 1, wherein the bus interface is configured to provide a constant-weight encoding to provide the encoded word.

3. The apparatus according to claim 2, wherein:
the encoded word is a member of a set of unique combinations of bits;
all members of the set of unique combinations of bits have an equal number of logic 1s and logic 0s; and
a total of the members of the set is not a power of 2.

4. The apparatus according to claim 1, wherein the bus interface is configured to provide a nearly-constant-weight encoding to provide the encoded word.

5. The apparatus according to claim 4, wherein:
the encoded word is a member of a set of unique combinations of bits;
a substantial majority of members of the set of unique combinations of bits have an equal number of logic 1s and logic 0s; and
a total of the members of the set is a power of 2.

6. The apparatus according to claim 1, wherein the bus interface is configured to provide non-differential signaling for transmission of the encoded word.

7. The apparatus according to claim 6, wherein:
the bus width is selected from a first group consisting of 10, 41, and 163;
the encoded word is of a set of unique combinations of bits;
a substantial majority of members of the set of unique combinations of bits has an equal number of logic 1s and logic 0s; and
the weight of the code for at least the substantial majority of the members is selected from a second group consisting of 5, 20, and 81 respectively corresponding to the first group.

8. The apparatus according to claim 1, wherein the encoder is a k-to-N encoder for k a length of the data word which is less than the bus width and greater than the weight of the code.

9. An apparatus, comprising:
a bus interface for receiving information from a first die by a second die including the bus interface;
wherein a first portion of a bus associated with the bus interface is associated with data bits;
wherein a second portion of the bus associated with the bus interface is associated with encoding bits;
wherein the bus interface is configured to decode an encoded word to provide a data word;
wherein the encoded word is associated with a combinatorial number system; and
wherein the bus interface comprises:
a decoder coupled to receive the encoded word and configured to decode the encoded word to provide the data word; and the decoder further configured to decode the encoded word encoded according to an $$\binom{N}{r}$$

code using the combinatorial number system for N a bus width of the bus and for r a weight of the code.

10. The apparatus according to claim 9, wherein the bus interface is configured to decode a constant-weight encoding of the encoded word to provide the data word.

11. The apparatus according to claim 10, wherein:
the encoded word is a member of a set of unique combinations of bits;
all members of the set of unique combinations of bits have an equal number of logic 1s and logic 0s; and
a total of the members of the set is not a power of 2.

12. The apparatus according to claim 9, wherein the bus interface is configured to decode a nearly-constant-weight encoding of the encoded word to provide the data word.

13. The apparatus according to claim 12, wherein:
the encoded word is a member of a set of unique combinations of bits;
a substantial majority of members of the set of unique combinations of bits have an equal number of logic 1s and logic 0s; and
a total of the members of the set is a power of 2.

14. The apparatus according to claim 9, wherein the decoder is an N-to-k decoder for k a length of the data word which is less than the bus width and greater than the weight of the code.

15. The apparatus according to claim 14, wherein:
the bus width is selected from a first group consisting of 10, 41, and 163;
the encoded word is of a set of unique combinations of bits;
a substantial majority of members of the set of unique combinations of bits have an equal number of logic 1s and logic 0s; and
the weight of the code for at least the substantial majority is selected from a second group consisting of 5, 20, and 81 respectively corresponding to the first group.

16. A method, comprising:
obtaining a data word by an encoder of a bus interface of a first die;
encoding the data word with the encoder to provide an encoded word;
wherein the encoded word is encoded with a code associated with a combinatorial number system;
wherein the encoding comprises replacing the data word with at least a nearly-constant-weighted word to provide the encoded word; and
transmitting the encoded word over a bus to a second die;
wherein the encoder is configured to encode the data word according to an $$\binom{N}{r}$$

code for the code associated with the combinatorial number system for N a bus width of the bus and for r a weight of the code to provide the encoded word.

17. The method according to claim 16, wherein the encoding comprises:
accessing a set of unique combinations of bits representing the code; and
selecting the at least a nearly-constant-weighted word to replace the data word therewith;
wherein a substantial majority of members of the set of unique combinations of bits has an equal number of logic 1s and logic 0s; and
wherein a total of the members of the set is a power of 2.

18. The method according to claim 16, wherein:
the encoder is a k-to-N encoder for k a length of the data word which is less than the bus width and greater than the weight of the code;
the bus width is selected from a first group consisting of 10, 41, and 163; and
the weight of the code for at least the substantial majority of the members is selected from a second group consisting of 5, 20, and 81 respectively corresponding to the first group.

* * * * *